(12) United States Patent
Lischer

(10) Patent No.: US 9,181,854 B2
(45) Date of Patent: Nov. 10, 2015

(54) TURBOCHARGER

(75) Inventor: Thomas Lischer, Neustadt (DE)

(73) Assignee: BorgWarner Inc., Auburn Hills, MI (US)

( * ) Notice: Subject to any disclaimer, the term of this patent is extended or adjusted under 35 U.S.C. 154(b) by 438 days.

(21) Appl. No.: 13/254,025

(22) PCT Filed: Feb. 23, 2010

(86) PCT No.: PCT/US2010/024973
§ 371 (c)(1),
(2), (4) Date: Aug. 31, 2011

(87) PCT Pub. No.: WO2010/101728
PCT Pub. Date: Sep. 10, 2010

(65) Prior Publication Data
US 2012/0023930 A1     Feb. 2, 2012

(30) Foreign Application Priority Data
Mar. 3, 2009 (DE) .......................... 10 2009 011 451

(51) Int. Cl.
*F02B 33/44* (2006.01)
*F02B 47/08* (2006.01)
*F02B 37/00* (2006.01)
*F02M 25/07* (2006.01)

(52) U.S. Cl.
CPC ............ *F02B 37/00* (2013.01); *F02M 25/0709* (2013.01); *F02M 25/0718* (2013.01); *F02M 25/0722* (2013.01); *F02M 25/0727* (2013.01); *Y02T 10/121* (2013.01); *Y02T 10/144* (2013.01)

(58) Field of Classification Search
CPC ............... F02B 37/00; F02M 25/0709; F02M 25/0718; F02M 25/0722; F02M 25/0727; Y02T 10/144; Y02T 10/121
USPC .......................... 60/600, 605.1, 605.2, 605.3
See application file for complete search history.

(56) References Cited

U.S. PATENT DOCUMENTS

| 5,333,456 A | * | 8/1994 | Bollinger | 60/605.2 |
| 6,267,106 B1 | * | 7/2001 | Feucht | 123/568.17 |
| 6,427,671 B1 | * | 8/2002 | Holze et al. | 123/568.17 |
| 6,502,397 B1 | * | 1/2003 | Lundqvist | 60/605.2 |

(Continued)

FOREIGN PATENT DOCUMENTS

WO    WO 2008095658 A1 * 8/2008 ............. F02B 37/22

*Primary Examiner* — Kenneth Bomberg
*Assistant Examiner* — Paolo Isada
(74) *Attorney, Agent, or Firm* — A. Michael Tucker; Stephan A. Pendorf; Patent Central LLC

(57) ABSTRACT

The present invention relates to a turbocharger (1) for an internal combustion engine (2) having at least one exhaust-gas recirculation line (3) which enters via an exhaust-gas mixing-in opening (12) into an intake line (10) of the internal combustion engine (2); having a turbine (4); and having a compressor (5); which is drive-connected to the turbine (4) and which has a compressor wheel (6) which is arranged in a compressor housing (7) into which the intake line (10) opens via a compressor inlet (11), having a mixing device (18) for mixing recirculated exhaust gas and fresh air, with the mixing device (18) having at least two guide plates (21, 22) in the shape of truncated cone shell segments which are arranged radially offset with respect to one another and which delimit in each case one inflow gap (23, 24) at their longitudinal edges arranged offset with respect to one another.

8 Claims, 3 Drawing Sheets

(56) References Cited

U.S. PATENT DOCUMENTS

| | | | |
|---|---|---|---|
| 7,552,722 B1* | 6/2009 | Shieh et al. | 123/568.17 |
| 2001/0027784 A1* | 10/2001 | Schmid et al. | 123/568.17 |
| 2007/0256411 A1* | 11/2007 | Marsal et al. | 60/297 |
| 2008/0066466 A1* | 3/2008 | Melchior | 60/600 |
| 2008/0196408 A1* | 8/2008 | Li et al. | 60/605.2 |
| 2009/0000297 A1* | 1/2009 | Joergl et al. | 60/605.3 |
| 2010/0281766 A1* | 11/2010 | Livshits | 44/458 |
| 2011/0233436 A1* | 9/2011 | Perr | 251/207 |
| 2011/0265772 A1* | 11/2011 | Teng et al. | 123/568.11 |

* cited by examiner

TURBOCHARGER

The invention relates to a turbocharger according to the preamble of claim 1.

A generic turbocharger is known from WO 2008/095658 A1.

Turbochargers of said type are used in internal combustion engines which, in order to adhere to the legally prescribed exhaust-gas limit values, recirculate large exhaust-gas quantities into the intake path of the engine over a wide operating range. This is carried out in the present prior art by means of so-called high-pressure exhaust-gas recirculation. Low-pressure-side exhaust-gas recirculation has greater potential than this. Here, the exhaust gas is extracted downstream of the turbine after the outlet out of the diesel particle filter and is recirculated via a regulating valve and if appropriate via a cooler into the fresh-air path upstream of the compressor of the exhaust-gas turbocharger. Here, with regard to as homogeneous an inflow into the compressor as possible, it is advantageous for the recirculated exhaust gas to be thoroughly mixed with the fresh air as completely as possible, but this would lead to very long mixing paths in the intake duct in the case of an injection without further measures. This increases the installation space required for the inlet path, but such installation space is often not available in the engine bays of modern vehicles.

It is therefore an object of the present invention to create a turbocharger for an internal combustion engine according to the preamble of claim 1 which overcomes the disadvantages specified above.

Said object is achieved by means of the features of claim 1.

In the design of the turbocharger according to the invention, a mixing device is provided with at least two truncated cone shell segments arranged offset in order to obtain the most complete possible mixing of the recirculated exhaust gas with the fresh air.

The subclaims relate to advantageous refinements of the invention.

Further details, advantages and features of the invention can be gathered from the following description of an exemplary embodiment and the drawing, in which.

Figure 1:
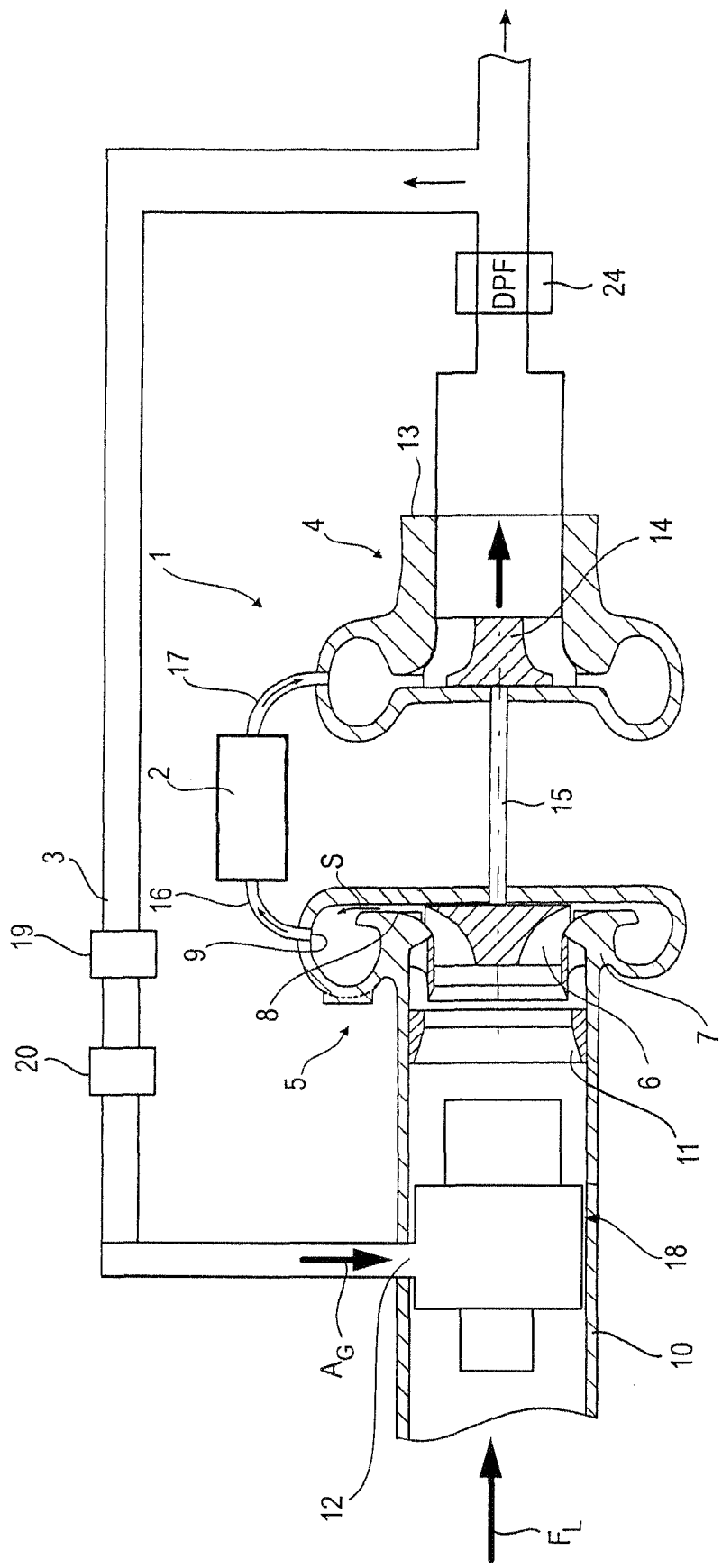
FIG. 1 shows a schematically highly simplified sectional illustration of a turbocharger according to the invention.

The turbocharger 1 illustrated in FIG. 1 has a turbine 4 with a turbine wheel 14 arranged in a turbine housing 13. Said turbine wheel 14 is connected by means of a rotor shaft 15 to a compressor wheel 6, which is arranged in a compressor housing 7, of a compressor 5.

An exhaust-gas recirculation line 3 from an engine 2 leads via a regulating valve 19 and a cooler 20 through an exhaust-gas mixing-in opening 12 into an intake line 10 of the engine 2. A mixing device 18 is arranged in the intake line 10 upstream of the compressor inlet 11.

The illustration also shows a supply line 16 from the compressor outlet 9 to the engine 2 and an exhaust line 17 from the engine 2 to the turbine housing 13.

By means of said arrangement according to the invention of the exhaust-gas recirculation line 3, the exhaust gas $A_G$ is conducted through the exhaust-gas mixing-in opening 12 into the intake line 10. Here, the exhaust gas $A_G$ impinges on the fresh air $F_L$, which exhaust gas $A_G$ and fresh air $F_L$ together are then mixed through the mixing device 18 in the flow direction of the fresh air $F_L$. After the virtually complete thorough mixing of the two material flows, the mixture flows through the compressor inlet 11 into the diffuser 8.

Viewing FIG. 2 and FIG. 3 together, the mixing device 18 according to the invention will be described in detail below. As can be seen from FIG. 2, the mixing device 18 comprises a cylindrical pipe element 26 with a small diameter, via which fresh air $F_L$ is supplied, a housing element 25, via which exhaust gas $A_G$ is supplied, and a cylindrical pipe element 27 with a large diameter, from which the mixture of fresh air and exhaust gas $(F_L+A_G)$ is conducted into the compressor 5.

Figure 3:
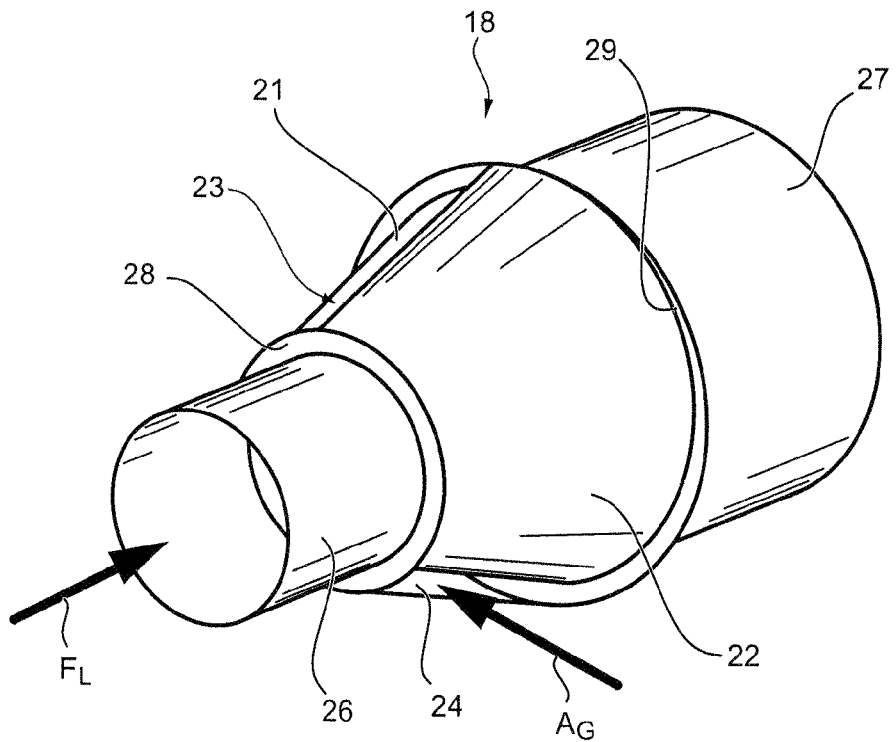
FIG. 3 shows a perspective view of the mixing device from FIG. 2 without the encasing housing element.

FIG. 3 shows the mixing device 18 without the housing element 25 which encases guide plates 21, 22 arranged in the interior. Said guide plates 21 and 22 are formed as two truncated cone shell segments. Said guide plates 21, 22 are fastened at one side by means of a connecting wall 28 to the pipe element 26 with the small diameter and at the other side by means of a connecting wall 29 to the pipe element 27 with the large diameter. The guide plates 21, 22 delimit, at their longitudinal edges arranged offset with respect to one another by 180°, in each case one inflow gap 23 and 24 for the exhaust gas $A_G$ to be conducted in.

The mixing of the exhaust gas into the fresh-air flow in the intake line 10 can take place, with a swirl being generated, by means of the mixing element arranged upstream of the compressor. Depending on the type of radial offset of the truncated cone shell segments 21 and 22, it is possible to generate swirl of the incoming flow in the same direction as or opposite direction to the compressor wheel 6. The mixing device 18 can preferably be positioned directly upstream or in the housing 7 of the compressor. In this way, it is possible by means of the mixing device 18 of the turbocharger 1 according to the invention to realize a drastically reduced mixing path in the intake line 10 and to further minimize the installation space required in the engine bay for the turbocharger 1.

Figure 4:
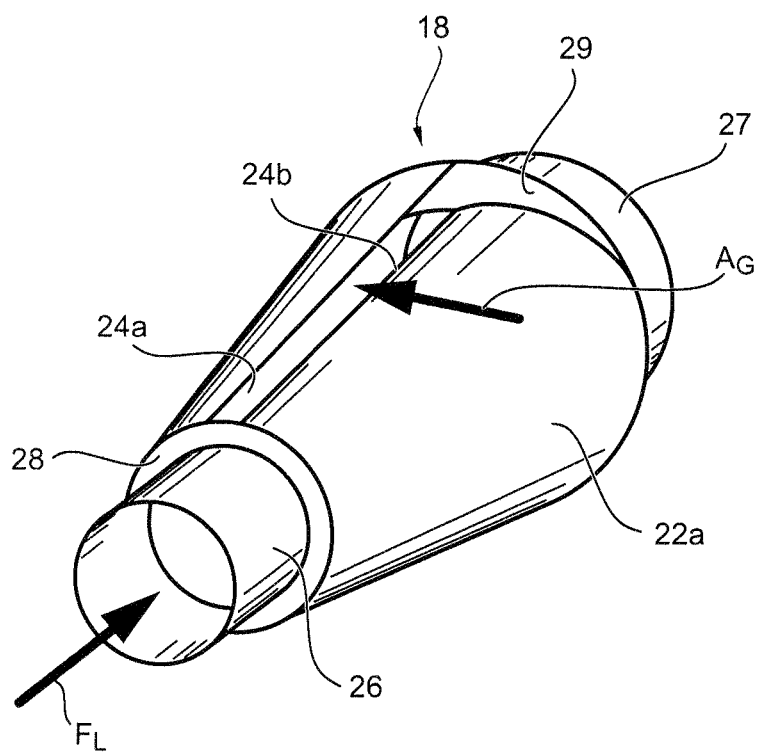
FIG. 4 shows a perspective view corresponding to FIG. 3 of an alternative embodiment of the mixing device.

FIG. 4 shows a further embodiment of the mixing device 18 according to the invention for the turbocharger 1 according to the invention. Here, in contrast to the mixing device 18 illustrated in FIG. 3, a single-piece guide plate 22a is formed in the shape of a truncated cone and is fixed to the connecting walls 28 and 29. Said guide plate 22a has a single inflow gap 24a for the inlet of the exhaust gas $A_G$, which inflow gap 24a is formed in the split-open truncated cone lateral surface of the guide plate 22a by virtue of an end section 24b of the guide plate 22a being bent inward and fastened to the connecting walls 28 and 29. The further, inward-leading profile of the end section 24b of the guide plate 22a, which is however not visible in this illustration of FIG. 4, can preferably be curved in a spiral shape.

Figure 2:
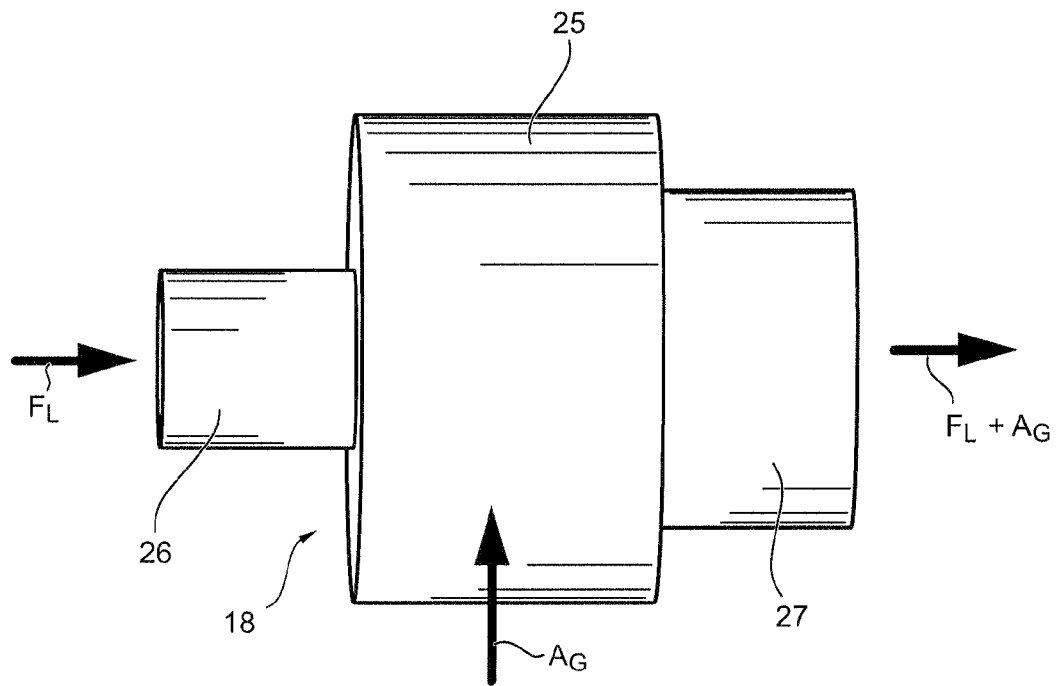
FIG. 2 shows a side view of a particularly preferred embodiment of a mixing device.

With regard to all other correlating features, in particular the housing element 25, reference may be made to the description of FIGS. 1 to 3.

In addition to the disclosure, reference is made explicitly to the diagrammatic illustration of the invention in FIG. 1 to FIG. 4.

LIST OF REFERENCE SYMBOLS

1 Turbocharger/exhaust-gas turbocharger
2 Engine
3 Exhaust-gas recirculation line
4 Turbine
5 Compressor
6 Compressor wheel
7 Compressor housing
8 Diffuser 9 Compressor outlet
10 Intake line
11 Compressor inlet
12 Exhaust-gas mixing-in opening
13 Turbine housing
14 Turbine wheel
15 Rotor shaft
16 Supply line
17 Exhaust line
18 Mixing device
19 Regulating valve
20 Cooler
21, 22, 22a Guide plates
23, 24, 24a Inflow gap
24b End section of the guide plate 22a
25 Housing element
26 Cylindrical pipe piece with small diameter
27 Cylindrical pipe piece with large diameter
28, 29 Connecting wall
$A_G$ Exhaust gas
$F_L$ Fresh air
S Flow direction of the compressed air

The invention claimed is:

1. A turbocharger (1) for an internal combustion engine (2) comprising:
    at least one exhaust-gas recirculation line (3) which enters via an exhaust-gas mixing-in opening (12) into an intake line (10) of the internal combustion engine (2);
    a turbine (4);
    a compressor (5) which is drive-connected to the turbine (4) and which has a compressor wheel (6) which is arranged in a compressor housing (7) into which the intake line (10) opens via a compressor inlet (11), and
    a mixing device (18) for mixing recirculated exhaust gas and fresh air,
    the mixing device (18) including at least two guide plates (21, 22) in the shape of truncated cone shell segments, the guide plates (21, 22) being arranged radially offset with respect to one another, each guide plate having a plurality of longitudinal edges, the longitudinal edges being arranged offset with respect to one another such that an inflow gap (23, 24) is defined between each longitudinal edge and a portion of a neighboring guide plate.

2. The turbocharger as claimed in claim 1, wherein the mixing device (18) conducts the exhaust-gas flow from the exhaust-gas recirculation line (3) into the air flow of the intake line (10) via the inflow gaps (23, 24) of the guide plates (21, 22) which are arranged radially offset with respect to one another.

3. The turbocharger as claimed in claim 1, wherein the longitudinal edges of the guide plates (21, 22) of the mixing device (18) are arranged offset with respect to one another such that the longitudinal edges are substantially equally spaced in a circumferential direction of the mixing device.

4. The turbocharger as claimed in claim 1, wherein the guide plates (21, 22) of the mixing device (18) are encased by a cylindrical housing element (25).

5. The turbocharger as claimed in claim 1, wherein the guide plates (21, 22) of the mixing device (18) are encased by a spiral-shaped housing element (25).

6. The turbocharger as claimed in claim 1, wherein the mixing device (18) is arranged between the exhaust-gas mixing-in opening (12) and the compressor wheel (6).

7. The turbocharger as claimed in claim 1, wherein the mixing device (18) is arranged in the compressor housing (7) upstream of the compressor wheel (6).

8. The turbocharger as claimed in claim 1, wherein the size of the inflow gaps (23, 24) between the guide plates (21, 22) varies over the length of the inflow gaps (23, 24) in an axial direction of the mixing device (18).

\* \* \* \* \*